United States Patent
Yukimasa

(10) Patent No.: US 12,520,122 B2
(45) Date of Patent: Jan. 6, 2026

(54) COMMUNICATION APPARATUS, CONTROL METHOD, AND COMPUTER-READABLE STORAGE MEDIUM

(71) Applicant: CANON KABUSHIKI KAISHA, Tokyo (JP)

(72) Inventor: Koji Yukimasa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 459 days.

(21) Appl. No.: 18/119,380

(22) Filed: Mar. 9, 2023

(65) Prior Publication Data
US 2023/0224690 A1 Jul. 13, 2023

Related U.S. Application Data

(63) Continuation of application No. PCT/JP2021/029498, filed on Aug. 10, 2021.

(30) Foreign Application Priority Data

Sep. 23, 2020 (JP) ................................. 2020-158970

(51) Int. Cl.
H04W 48/16 (2009.01)
H04W 8/18 (2009.01)

(52) U.S. Cl.
CPC .................................. H04W 8/183 (2013.01)

(58) Field of Classification Search
None
See application file for complete search history.

(56) References Cited

U.S. PATENT DOCUMENTS

2017/0201934 A1* 7/2017 Kim ...................... H04W 48/18

FOREIGN PATENT DOCUMENTS

| DE | 102013114500 A1 * | 6/2015 | ............ H04W 8/183 |
|----|---------|---------|---|
| JP | 2012-109973 A | 6/2012 | |
| JP | 2015-527774 A | 9/2015 | |
| JP | 2016-525316 A | 8/2016 | |
| WO | 2013-188545 A1 | 12/2013 | |
| WO | 2015-009585 A1 | 1/2015 | |

OTHER PUBLICATIONS

Muller-Weinfurther Stefan, Mobile radio communication . . . radio communication device, Jun. 15, 2015, Intel IP Corporation.*
International Search Opinion of PCT/JP2021/029498 dated Nov. 16, 2021 (8 pages).

* cited by examiner

*Primary Examiner* — Gary Lafontant
(74) *Attorney, Agent, or Firm* — VENABLE LLP

(57) ABSTRACT

A communication apparatus, notifies, in a case where an application using communication is activated, a predetermined information processing apparatus of information concerning the application, obtains, based on information concerning contracts of a user of the communication apparatus with respect to a plurality of communication lines respectively provided by a plurality of communication carriers, from the information processing apparatus, information concerning a communication line recommended to be used to execute the application among the plurality of communication lines, and executes, based on the obtained information concerning the recommended communication line, control concerning setting of a use communication line.

13 Claims, 9 Drawing Sheets

COMMUNICATION APPARATUS, CONTROL METHOD, AND COMPUTER-READABLE STORAGE MEDIUM

CROSS-REFERENCE TO RELATED APPLICATIONS

This application is a Continuation of International Patent Application No. PCT/JP2021/029498, filed Aug. 10, 2021, which claims the benefit of Japanese Patent Application No. 2020-158970 filed Sep. 23, 2020, both of which are hereby incorporated by reference herein in their entirety.

BACKGROUND OF THE INVENTION

Field of the Invention

The present invention relates to a technique for setting control of a use communication line.

Background Art

In a cellular communication network, a user contracts with a communication carrier, and a wireless communication terminal held by the user performs wireless communication using a communication line provided by the communication carrier. The terminal performs communication using a line stored in a Subscriber Identity Module (SIM) card or an Embedded SIM (eSIM) in the terminal. The terminal can include a plurality of SIMs/eSIMs, and switch a use communication line by switching among the SIMs/eSIMs (see Japanese Patent Laid-Open No. 2016-525316).

In the technique described in Japanese Patent Laid-Open No. 2016-525316, the user needs to select a SIM to be used. However, to make such selection, the user needs to know in advance which of the SIMS is to be used (which of the lines is to be used) for each of various kinds of communications, which may be inconvenient.

SUMMARY OF THE INVENTION

The present invention provides a technique of improving convenience when selecting a SIM to be used by a terminal.

According to one aspect of the present invention, there is provided a communication apparatus comprising at least one memory that stores a set of instructions; and at least one processor that executes the instructions, the instructions, when executed, causing the communication apparatus to perform operations including: notifying, in a case where an application using communication is activated, a predetermined information processing apparatus of information concerning the application; obtaining, based on information concerning contracts of a user of the communication apparatus with respect to a plurality of communication lines respectively provided by a plurality of communication carriers, from the predetermined information processing apparatus, information concerning a communication line recommended to be used to execute the application among the plurality of communication lines; and executing, based at least on the obtained information concerning the communication line, control concerning setting of a use communication line.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

Figure 1:
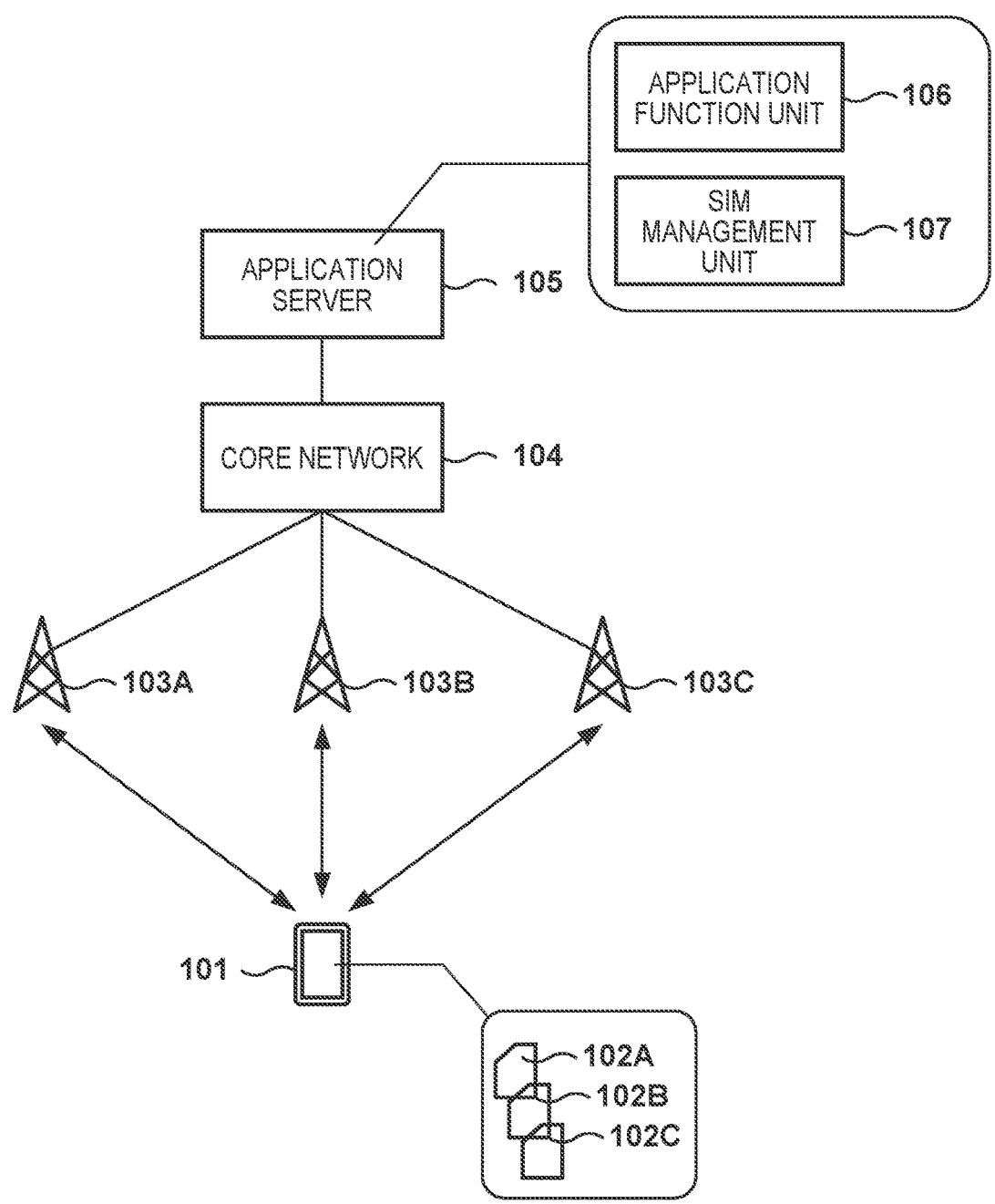
FIG. 1 is a view showing an example of the configuration of a system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(Configuration of System)

An example of the configuration of a wireless communication system according to an embodiment will be described with reference to FIG. 1. In one example, the wireless communication system is a cellular communication system in which a user contracts with a communication carrier and a terminal owned by the user performs wireless communication using a communication line (wireless network) provided by the communication carrier. This terminal is formed by including, for example, two or more SIM cards or embedded SIMS (eSIMs) so as to use respective communication lines corresponding to two or more contracts. Note that such terminal in the cellular communication system will be exemplified below but this is merely an example and the following discussion is applicable to an arbitrary communication apparatus including modules concerning a plurality of communications respectively corresponding to a plurality of arbitrary communication lines. That is, the wireless communication system need not be a cellular communication system.

The wireless communication system includes, for example, a communication apparatus 101, base stations 103A to 103C, a core network 104, and an application server 105. The communication apparatus 101 is configured to use a plurality of SIM cards or eSIMs (SIMS 102A to 102C). For example, the communication apparatus 101 can be configured to perform communication via the base station 103A using the SIM 102A, perform communication via the base station 103B using the SIM 102B, and perform communication via the base station 103C using the SIM 102C. The base stations 103A to 103C are, for example, base stations in the cellular communication system. Note that in one example, the base stations 103A to 103C may be base stations operated by different communication carriers or base stations operated by a common communication carrier. The communication carrier is not limited to a Mobile Network Operator (MNO) and may be a Mobile Virtual Network Operator (MVNO). In one example, the user of the communication apparatus 101 can contract with an MNO by the SIM 102A, and contract, by the SIM 102B, with an MVNO that provides a communication service using a base station installed by the MNO. In this case, the base stations as the connection destinations by the SIMS 102A and 102B can be the same. However, in this case as well, the communication apparatus 101 needs to use the SIM 102A to use the communication service of the MNO, and needs to use the SIM 102B to use the communication service of the MVNO.

The base stations 103A to 103C are connected to the core network 104. Note that FIG. 1 shows an example in which the base stations 103A to 103C are connected to the common core network 104. However, for example, base stations installed by different MNOs can be connected to different core networks 104 prepared by the respective MNOs. The core network 104 includes a node that executes various control operations for providing a wireless communication service to the communication apparatus 101. Note that the core network 104 has an arrangement prepared by a general communication carrier and details thereof will not be described.

The application server 105 provides, to the communication apparatus 101, a predetermined application service using data communication in the user data plane. The application service can include, for example, a messaging service, a video/music streaming service, and a device control service. The communication apparatus 101 can communicate with the application server 105 via the base station (one of the base stations 103A to 103C) and the core network 104 to use the application service provided by the application server 105.

The application server 105 is provided outside the core network 104 so as to be connectable via, for example, the Internet. Note that the application server 105 can be prepared outside the core network 104 by an application provider but, for example, may be prepared in the core network 104 by a communication carrier. If the application server 105 is prepared outside the core network 104, it is connected to the core network 104 via, for example, a gateway (not shown) provided between the core network 104 and an external network.

In recent years, a communication carrier may provide a service in which data communication is free of charge with respect to specific application software. For example, if a carrier that provides a predetermined application service serves as an MVNO, it may set a usage fee of the predetermined application service and a communication fee to be free. That is, even if the communication apparatus 101 can use a common application service by any of the communication lines based on the contracts with the plurality of communication carriers, a different fee may be charged depending on the use communication line. Therefore, the user can use the application service at low charge by switching the SIM in accordance with the use application service based on the charge settings. The charge settings are merely examples. For example, it can be assumed that a given communication carrier prioritizes indices such as a communication speed and service quality over other communication carriers with respect to the predetermined application service. In this case as well, the user can effectively, selectively use the plurality of SIMS by selecting the use SIM in accordance with the appropriate indices such as the communication speed and service quality.

On the other hand, to selectively use the SIM in this way, the user needs to decide which of the SIMS is to be used after understanding the indices such as the fee/communication speed/service quality for each application service and each communication line, and to manually switch the SIM. Such operation is generally cumbersome and it is difficult for all the users to perform such operation. As a result, the user may select a SIM unsuitable for the application service and use it. In this embodiment, in consideration of this problem, a method for improving convenience when selecting a SIM suitable for the application service and using it is provided in the communication apparatus 101.

In this embodiment, for example, an application function unit 106 and a SIM management unit 107 are implemented in the application server 105. Note that the application server 105 can be implemented by a general-purpose server. The application server 105 can implement the application function unit 106 and the SIM management unit 107 when, for example, one or more processors in the general-purpose server execute programs stored in a storage medium such as a hard disk or a memory. The application function unit 106 executes various control operations concerning the application service, and provides the application service to the communication apparatus 101. The SIM management unit 107 manages, for example, information concerning the SIMS included in the communication apparatus 101 that uses the application, and searches for a SIM suitable for the application and notifies the communication apparatus 101 of the recommended SIM. After that, the communication apparatus 101 sets the use SIM based on the notification. Thus, even if the user has no premise knowledge, the communication apparatus 101 can execute the application service using the appropriate SIM without performing a cumbersome operation.

(Arrangement of Communication Apparatus)

Figure 2:
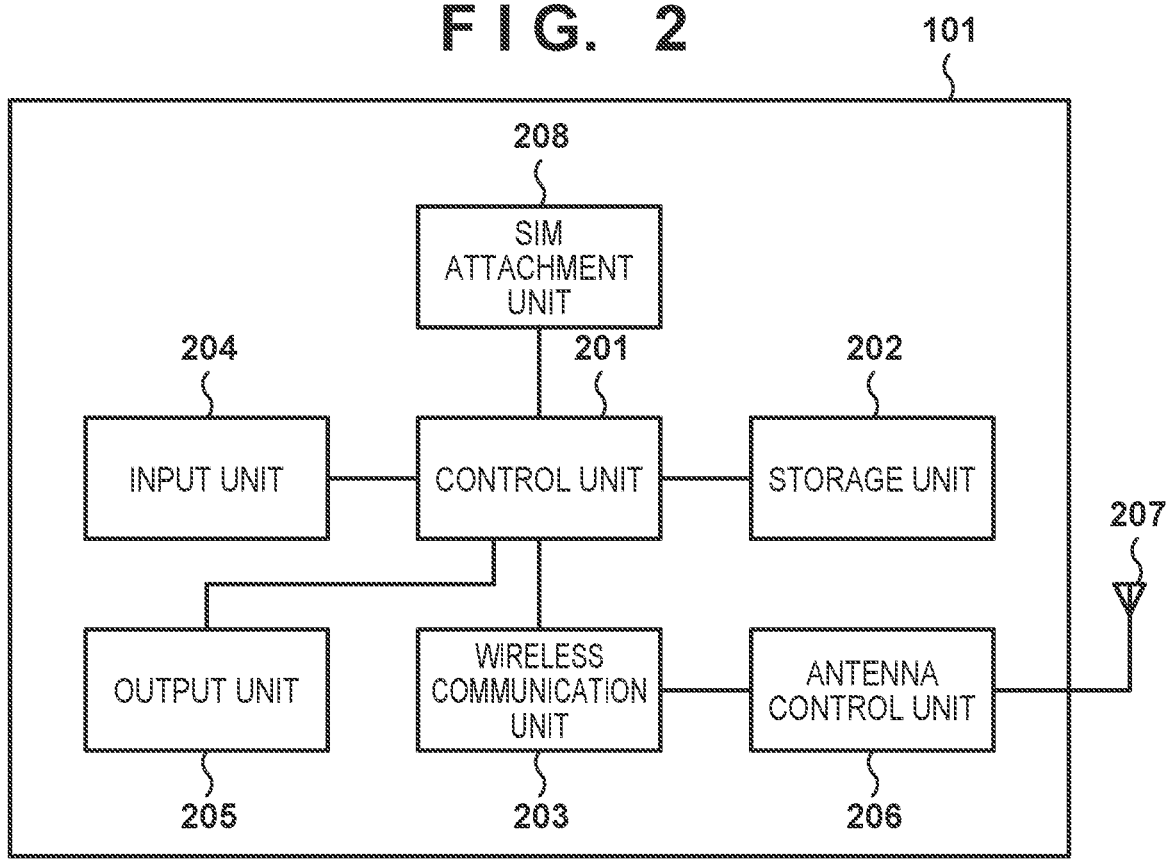
FIG. 2 is a block diagram showing an example of the hardware arrangement of a communication apparatus.

Subsequently, the arrangement of the communication apparatus 101 will be described. FIG. 2 is a block diagram showing an example of the hardware arrangement of the communication apparatus 101. The communication apparatus 101 includes, for example, a control unit 201, a storage unit 202, a wireless communication unit 203, an input unit 204, an output unit 205, an antenna control unit 206, an antenna 207, and a SIM attachment unit 208.

The control unit 201 controls the whole communication apparatus 101 by executing control programs stored in the storage unit 202. The storage unit 202 stores various kinds of information such as the control programs executed by the control unit 201, communication parameters, captured image data, and an application using communication. Various operations to be described later are implemented when the control unit 201 executes the control programs stored in the storage unit 202. The wireless communication unit 203 executes wireless communication complying with the cellular communication standard such as Long Term Evolution (LTE) or the 5th Generation (5G) by the 3rd Generation Partnership Project (3GPP). The wireless communication unit 203 converts, for example, data to be transmitted to the base station 103A, 103B, or 103C into the form of a radio signal, and transmits it via the antenna 207. For example, the wireless communication unit 203 receives, via the antenna 207, a radio signal transmitted from the base station 103A, 103B, or 103C, extracts data destined for the self-apparatus from the radio signal, and obtains it. Note that the antenna 207 undergoes directivity control by the antenna control unit 206, and is controlled to improve the radio quality of a reception signal coming from a predetermined direction and increase the intensity of a radio wave to be transmitted in the predetermined direction.

The input unit 204 accepts, from the user, various operation inputs for operating the communication apparatus 101. The input unit 204 can include, for example, buttons, a touch panel, and a microphone. The output unit 205 performs various kinds of information outputs to the user. For example, the output unit 205 includes, for example, a display such as a liquid crystal display, a light source such as a light emitting diode, a loudspeaker, and a vibrator, and the output by the output unit 205 includes, for example, at least one of visual display output, audio output, vibration output, and the like. Note that both the input unit 204 and the output unit 205 may be implemented by one module, like a touch panel display. Each of the input unit 204 and the output unit 205 may be incorporated in the communication apparatus 101 or may be formed as an external apparatus connected to the communication apparatus 101.

The SIM attachment unit 208 includes a slot to which a SIM card for which a communication line contract has been made with a communication carrier is attached. Note that the SIM may be an embedded SIM (eSIM). In this case, the SIM attachment unit 208 may be omitted. Note that in the case of the eSIM, the information of the SIM is electronically written in the storage unit 202 of the communication apparatus 101 or an internal storage unit that cannot be read from the outside. In this embodiment, the communication apparatus 101 is configured to include a plurality of SIMS corresponding to a plurality of communication line contracts, and a plurality of SIM attachment units 208 may be prepared.

Figure 3:
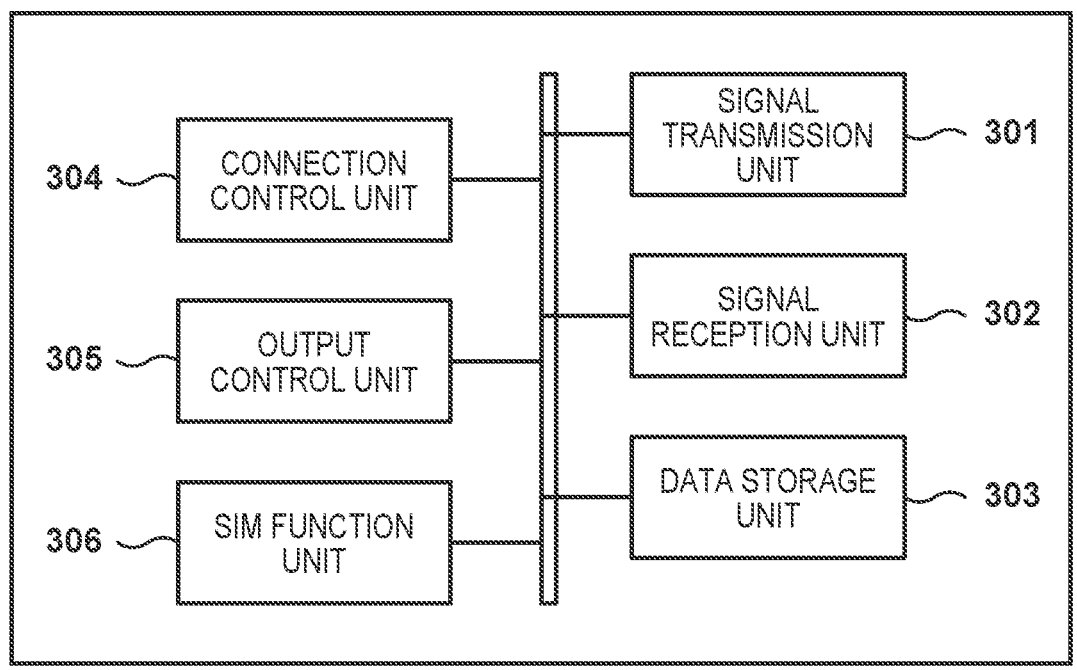
FIG. 3 is a block diagram showing an example of the functional arrangement of the communication apparatus.

FIG. 3 shows an example of the functional arrangement of the communication apparatus 101. The communication apparatus 101 includes, as functional components, for example, a signal transmission unit 301, a signal reception unit 302, a data storage unit 303, a connection control unit 304, an output control unit 305, and a SIM function unit 306. Under the control of the connection control unit 304, the communication apparatus 101 establishes, with at least one of the base stations 103A to 103C, connection to a cellular communication network, and transmits/receives signals via the base station as the connection destination using the signal transmission unit 301 and the signal reception unit 302. Note that for example, under the control of the connection control unit 304, the communication apparatus 101 may establish connection to a network such as a local area network other than the cellular communication network, and perform communication using the signal transmission unit 301 and the signal reception unit 302. At the end of communication, the communication apparatus 101 can disconnect the established connection under the control of the connection control unit 304.

The data storage unit 303 stores and holds various software components, subscriber contract information concerning a subscriber contract of a communication line in the cellular network, state information concerning the state of the apparatus, and the like. Note that the subscriber contract information can include various kinds of identification information, the service contents of the communication line, and remaining communication data amount information indicating the remaining data amount before communication is restricted in the contract. The identification information includes, for example, an Integrated Circuit Card ID (ICCID) or embedded Universal ICCID (eUICCID) corresponding to the identification number of the SIM card. The identification information can include an International Mobile Subscriber ID (IMSI) as a unique identification number assigned to the subscriber of the line contract. The identification information may include, for example, a Mobile Station International Subscriber Directory Number (MSISDN) corresponding to a telephone number. The apparatus state information can include an International Mobile Equipment ID (IMEI) as the identification information of the communication apparatus 101 and the model number of the communication apparatus 101. The apparatus state information may include information of the remaining battery amount of the communication apparatus 101, information of a communication delay time and a communication line speed obtained by the communication apparatus 101, and the position information of the communication apparatus 101.

The output control unit 305 executes control processing of causing the output unit 205 to output a screen, an audio, or a vibration. By the processing of the output control unit 305, the communication apparatus 101 can notify the user of various kinds of information. The SIM function unit 306 manages the subscriber communication line contract of the SIM card attached to the SIM attachment unit 208 or the eSIM stored in the communication apparatus 101.

(Procedure of Processing)

Figure 4:
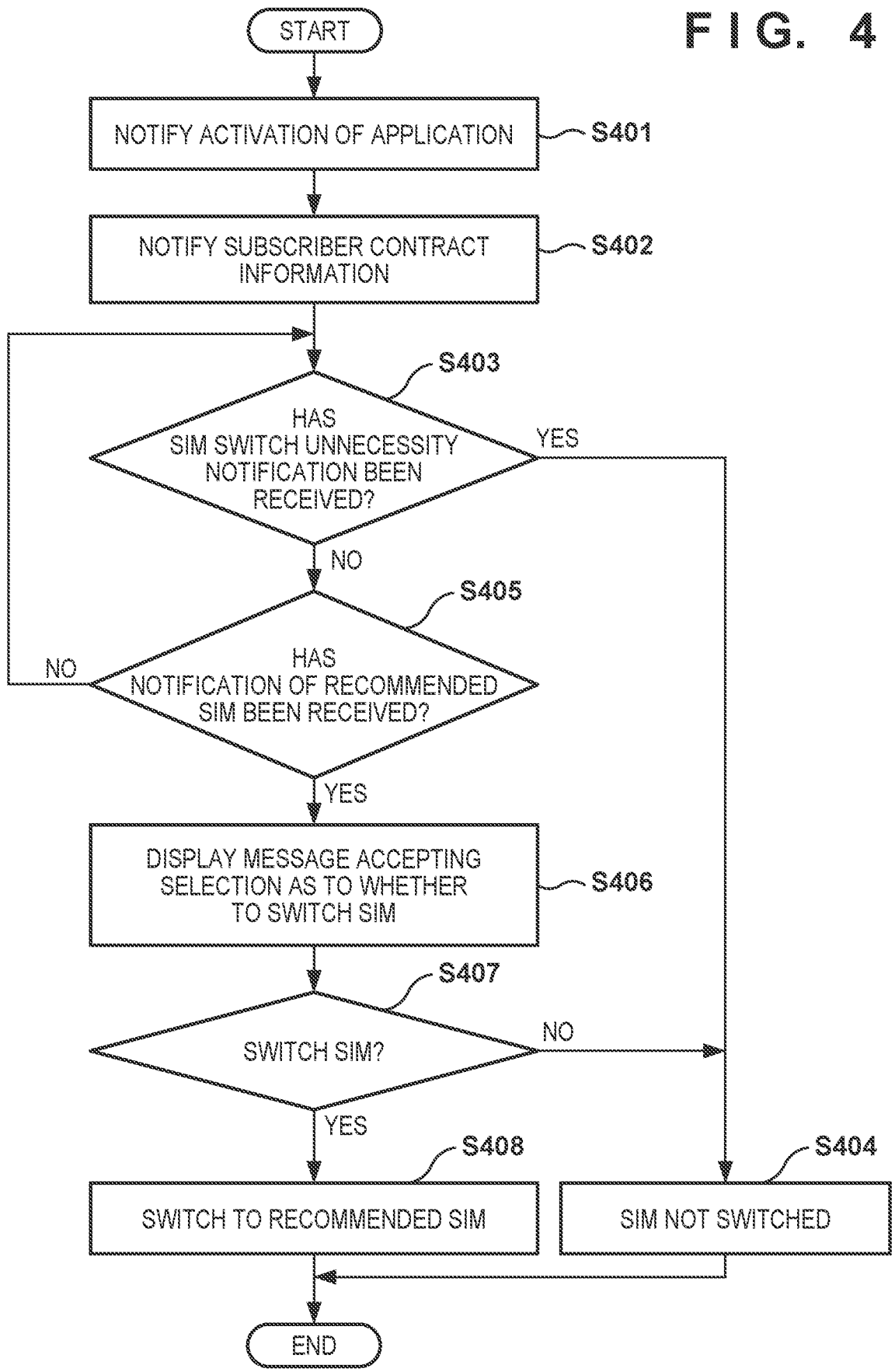
FIG. 4 is a flowchart illustrating an example of the procedure of processing executed by the communication apparatus.
Figure 5:
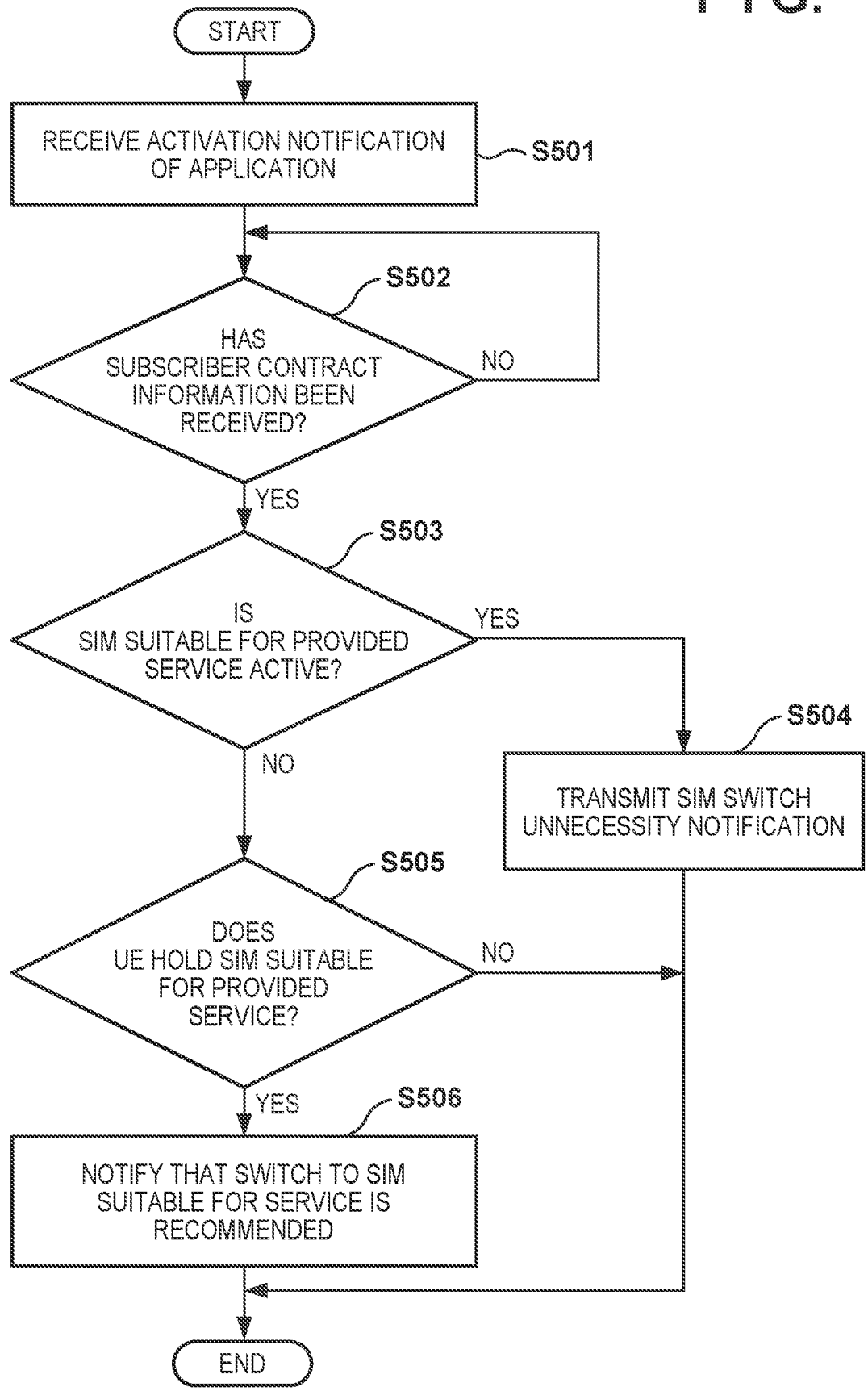
FIG. 5 is a flowchart illustrating an example of the procedure of processing executed by a server.
Figure 6:
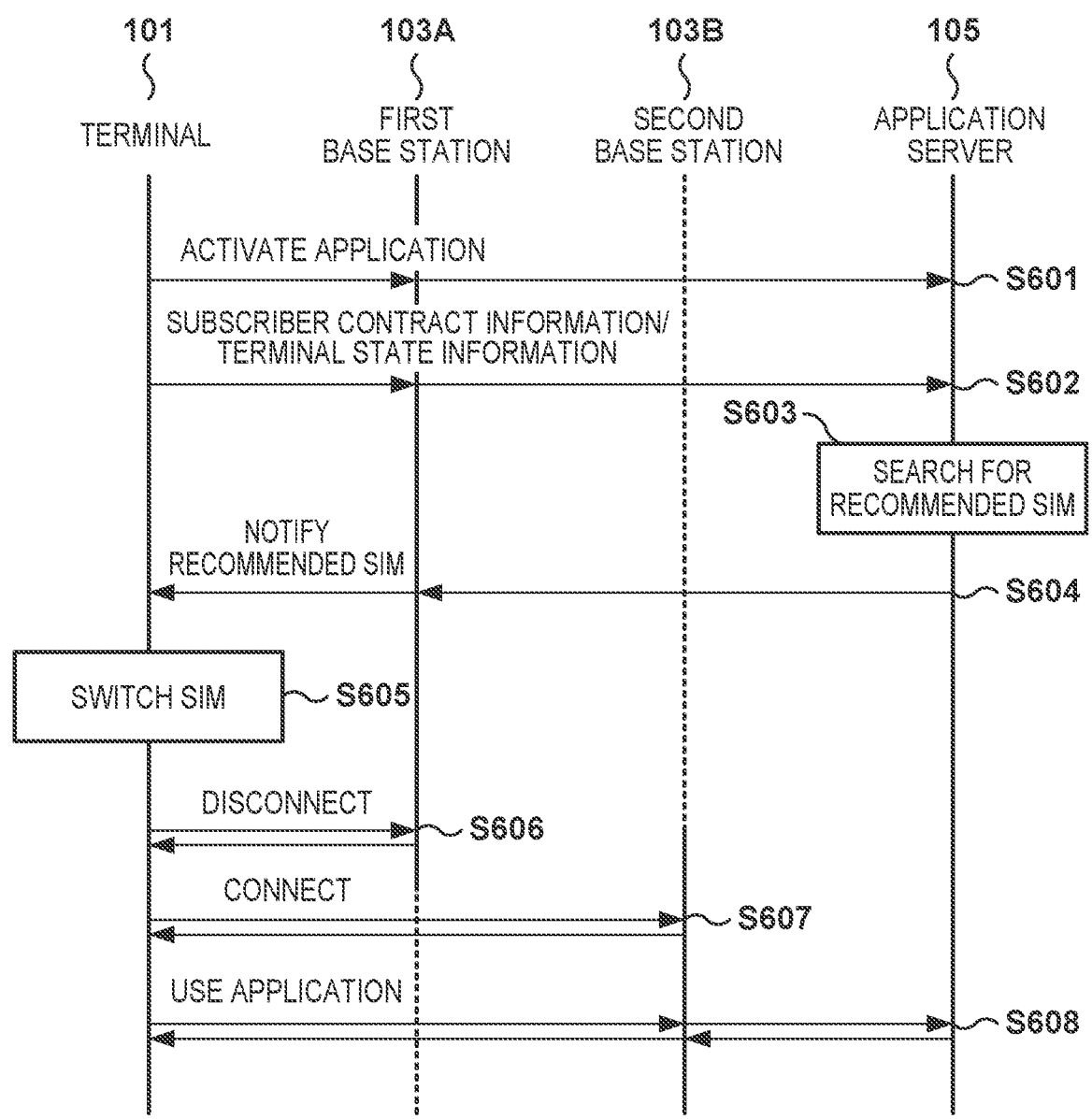
FIG. 6 is a sequence chart showing an example of the procedure of processing executed in a network.

Subsequently, examples of the procedure of processing executed between the communication apparatus 101 and the application server 105 according to this embodiment will be described with reference to FIGS. 4 to 6. FIG. 4 shows an example of the procedure of processing executed by the communication apparatus 101, and FIG. 5 shows an example of the procedure of processing executed by the application server 105. FIG. 6 shows an example of the procedure of processing in the system. Note that each process executed by the communication apparatus 101 can be implemented when the control unit 201 of the communication apparatus 101 executes the control program stored in the storage unit 202. Similarly, the processing shown in FIG. 5 can be implemented when the processor of the application server 105 executes a program stored in an internal storage medium. Note that the following processing is started in a state in which the communication apparatus 101 is connected to the base station 103A using the SIM 102A.

First, in response to an application activation instruction input by the user or an instruction by the internal program of the communication apparatus 101, the communication apparatus 101 activates an application corresponding to a predetermined service provided by the application server 105. Upon the activation of the application, the communication apparatus 101 notifies the application server 105 that provides the corresponding predetermined service, of the activation of the application (step S401, S601). Note that the communication apparatus 101 may notify the application server 105 of information for specifying the application. Thus, if the application server 105 provides a plurality of application services, the application server 105 can provide an appropriate application service to the communication apparatus 101 based on the notified information. After that, the application server 105 receives an application activation notification from the communication apparatus 101 (step S501). Note that as one example, the SIM 102B is suitable for the application. In this case, the communication apparatus 101 is recommended to switch the use SIM from the currently used SIM 102A to the currently unused SIM 102B.

After the activation of the application, the communication apparatus 101 transmits subscriber contract information to the application server 105 (step S402, S602). Note that in addition to the subscriber contract information, the communication apparatus 101 may transmit apparatus state information. After the reception of the application activation notification, the application server 105 stands by for reception of the subscriber contract information (step S502). If the subscriber contract information is received (YES in step S502), the application server 105 searches, based on the subscriber contract information (and the apparatus state information), for a SIM suitable for the application service from the SIMS usable by the communication apparatus 101. Then, the application server 105 determines whether the SIM 102A currently used by the communication apparatus 101 is suitable for the application service (step S503). If the application server 105 determines that the SIM 102A is a SIM suitable for the application service to be provided (YES in step S503), the application server 105 transmits, to the communication apparatus 101, a notification (switch unnecessity notification) indicating that it is unnecessary to switch the SIM (step S504). Upon receiving the switch unnecessity notification (YES in step S403), the communication apparatus 101 communicates with the application server 105 via the base station 103A to execute the application service without executing specific processing such as a SIM switch (step S404).

On the other hand, in this embodiment, the SIM 102A is not a SIM suitable for the application service to be provided (NO in step S503). At this time, based on the subscriber contract information received from the communication apparatus 101, the application server 105 determines whether the communication apparatus 101 holds an unused SIM suitable for the application service (step S505).

For example, assume that the communication apparatus 101 transmits the service contents of the communication line as the subscriber contract information to the application server 105. At this time, for example, assume that the service contents of the SIM 102A indicating a service in which high-speed communication up to 3 Gbytes of data and a telephone is possible and the service contents of the SIM 102B indicating a service in which video streaming is free of charge are transmitted as the subscriber contract information. Assume also that a notification that the SIM 102C is not attached is made. In this case, if a video playback application is activated in the communication apparatus 101, the application server 105 can determine the SIM 102B as a SIM suitable for the service.

The subscriber contract information may indicate the remaining amount of communication data for each SIM. For example, assume that the remaining amounts of communication data within a predetermined period are 100 Mbytes, 200 Mbytes, and 3 Gbytes for the SIMS 102A to 102C, respectively, and these numerical values are transmitted from the communication apparatus 101 to the application server 105. In this case, if the recommended remaining amount of use data of the activated application is 300 Mbytes, the application server 105 determines the SIM 102C as a SIM suitable for the service.

The subscriber contract information can include a SIM information identifier (ICCID). The ICCID includes a major industry identifier, a country code, and a code of a communication carrier. Assume that the mobile network codes of the SIMS 102A, 102B, and 102C are communication carrier A, communication carrier B, and communication carrier C, respectively. Assume also that the activated application service is provided by communication carrier B, and the user can receive a privilege from communication carrier B by using the application via the communication line using the SIM 102B. In this case, the application server 105 determines the SIM 102B as a SIM suitable for the service.

If the application server 105 determines that the communication apparatus 101 holds an unused SIM suitable for the application service (YES in step S505), the application server 105 transmits, to the communication apparatus 101, a notification indicating a switch to the SIM is recommended (step S506, S604). After transmitting the SIM switch recommendation notification to the communication apparatus 101, the application server 105 provides the application service to the communication apparatus 101. Note that at this time, even if the communication apparatus 101 executes the application service without switching the SIM, the application server 105 provides the application service. That is, even if the SIM is not switched to the recommended SIM, the application server 105 does not refuse to provide the application service. However, the present invention is not limited to this, and the application server 105 may refuse, as needed, to provide the application service to the communication apparatus 101 that performs communication using the SIM other than the recommended SIM.

If the recommended SIM notification is received (YES in step S405), the communication apparatus 101 displays, on the output unit 205, a message for inquiring of the user whether to switch the use SIM to the recommended SIM (step S406). Note that the display is merely an example, and an information notification may be performed by, for example, an audio or a vibration. The communication apparatus 101 accepts, via the input unit 204, a user selection of whether to switch to the recommended SIM. Note that the SIM may be switched without performing an information notification based on, for example, presetting by the user. In this case, the processing in step S406 may be skipped. If the communication apparatus 101 determines to switch to the recommended SIM (YES in step S407), the use SIM is switched to the recommended SIM (step S408, S605). In this switch operation, the communication apparatus 101 disconnects the connection from the base station 103A (S606), and is connected to the base station 103B corresponding to the changed SIM 102B (S607). Note that the communication apparatus 101 may switch the SIM after, for example, executing the processing of disconnecting the connection from the base station 103A. After the completion of the change of the base station as the connection destination, the communication apparatus 101 executes the application service provided by the application server 105 (S608).

Note that if the communication apparatus 101 determines not to switch to the recommended SIM (NO in step S407), it communicates with the application server 105 via the base station 103A to execute the application service without switching the SIM (step S404).

If the application server 105 determines that the communication apparatus 101 holds no unused SIM suitable for the application service (NO in step S505), the processing directly ends. On the other hand, if the communication apparatus 101 receives no SIM switch unnecessity notification (NO in step S403), it stands by for a recommended SIM notification (step S405). If, however, a predetermined period elapses without receiving the recommended SIM notification, the processing may end without performing any processing. Note that if the communication apparatus 101 supports an eSIM and the provider or partner of the application server 105 provides an eSIM suitable for the service, the application server 105 may notify the communication apparatus 101 of the eSIM. In this case, the communication apparatus 101 can perform, to the user, an information output for accepting an operation of whether to make a contract concerning the eSIM. If the user instructs to make a contract concerning the eSIM, the communication apparatus 101 can install the eSIM, and switch to the eSIM.

Figure 7:
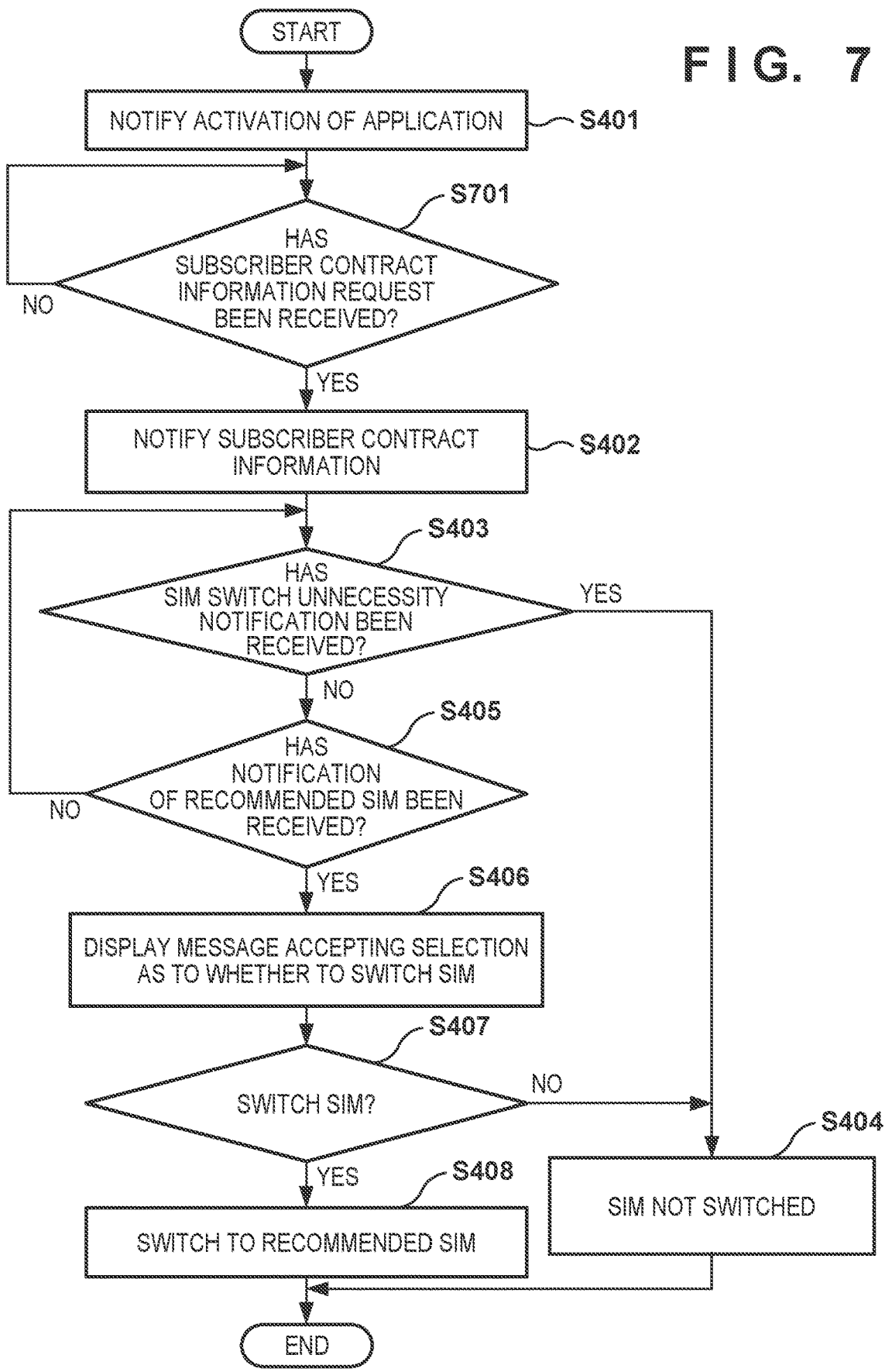
FIG. 7 is a flowchart illustrating another example of the procedure of the processing executed by the communication apparatus.
Figure 8:
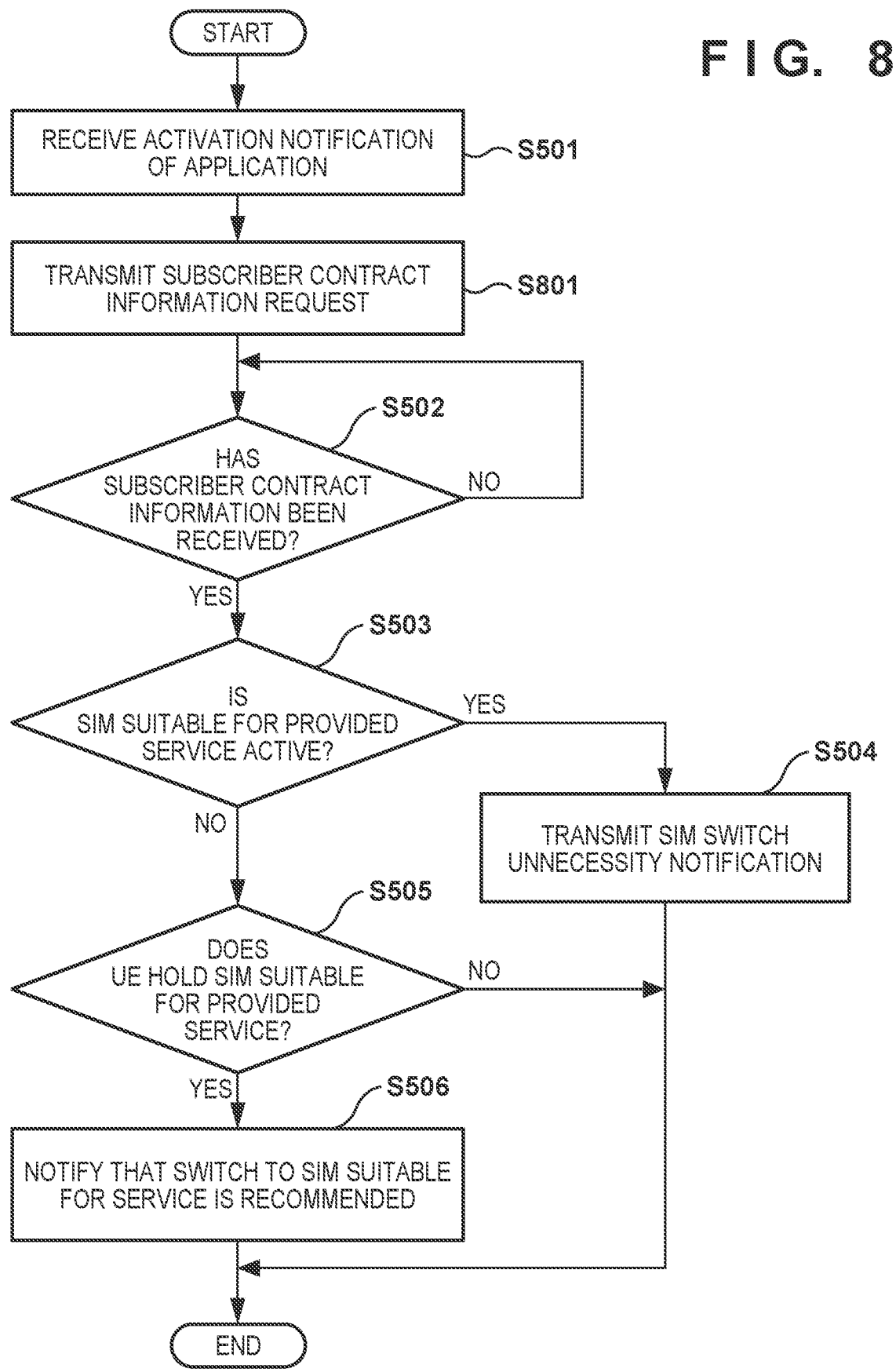
FIG. 8 is a flowchart illustrating another example of the procedure of the processing executed by the server.
Figure 9:
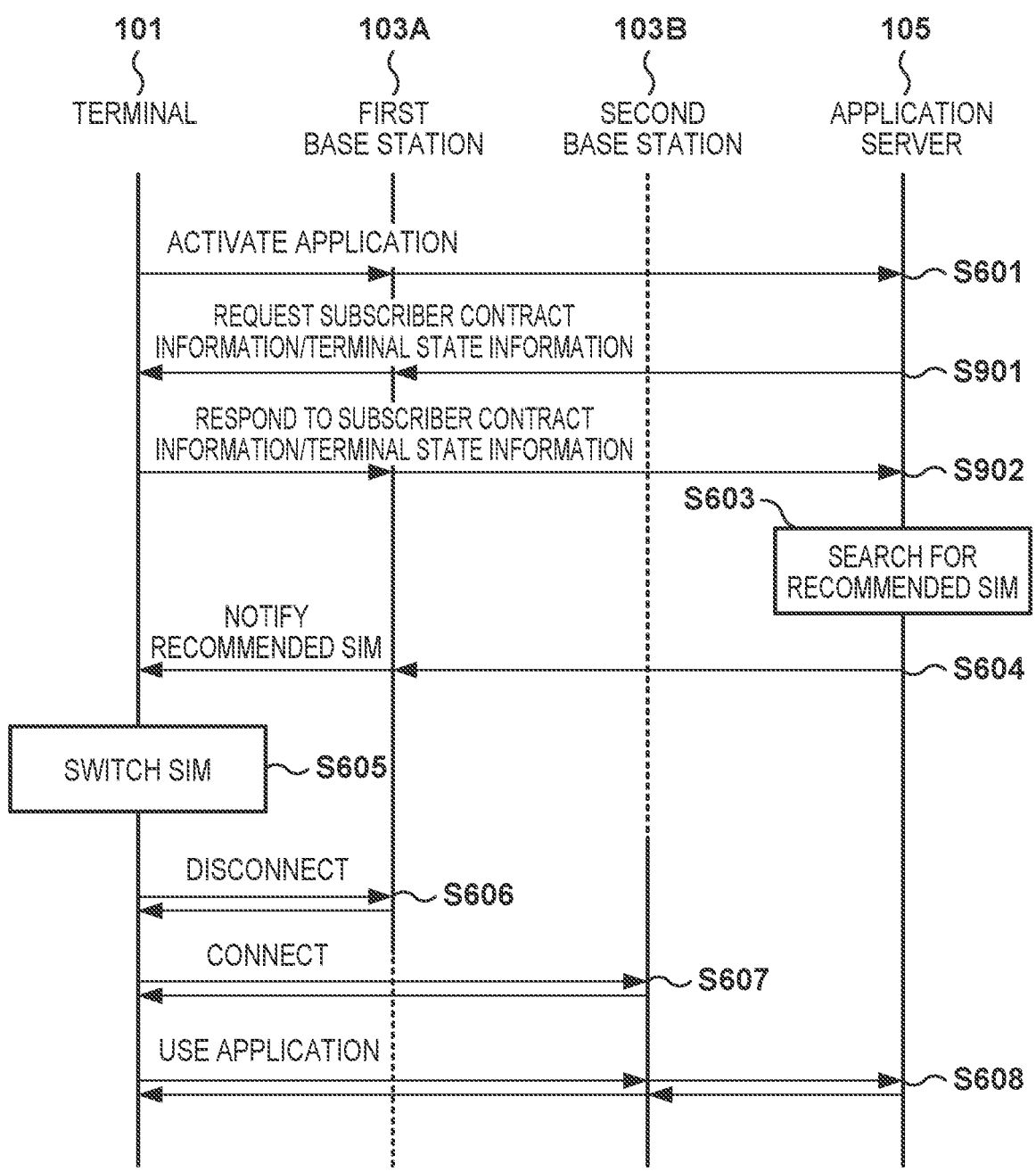
FIG. 9 is a sequence chart showing another example of the procedure of the processing executed in the network.

Note that an example in a case in which the communication apparatus 101 automatically notifies the application server 105 of the subscriber contract information after the activation of the application has been described with reference to FIGS. 4 to 6. However, the present invention is not limited to this. For example, to receive the notification, the application server 105 may transmit, to the communication apparatus 101, a notification request of the subscriber contract information. FIGS. 7 to 9 show an example of the procedure of processing in this case. Note that in FIGS. 7 to 9, the same reference symbols as those in FIGS. 4 to 6 denote the same processes and a description thereof will be omitted. In the processing shown in FIGS. 7 to 9, after receiving an application activation notification (step S501), the application server 105 transmits a subscriber contract information request to the communication apparatus 101 (step S801, S901). After the activation of the application (step S401), the communication apparatus 101 stands by for reception of the subscriber contract information request (step S701). If the subscriber contract information request is received (YES in step S701), the communication apparatus 101 notifies the application server 105 of the subscriber contract information (step S402, S902). In one example, the application server 105 may periodically obtain the subscriber contract information of the communication apparatus 101. In this case, at the time of activation of the application, the information need not be obtained. In this case, no subscriber contract information request is issued. Alternatively, the application server 105 may obtain the subscriber contract information for each communication carrier from, for example, a node in the core network 104 corresponding to each communication carrier. In these cases, the communication apparatus 101 may stand by for transmission of a SIM switch unnecessity notification or a recommended SIM notification without transmitting the subscriber contract information.

With the above processing, the communication apparatus 101 can flexibly use various communication lines in accordance with the application purpose by an operation which is easy even for the user having no premise knowledge, thereby improving user convenience.

Figure 10A:
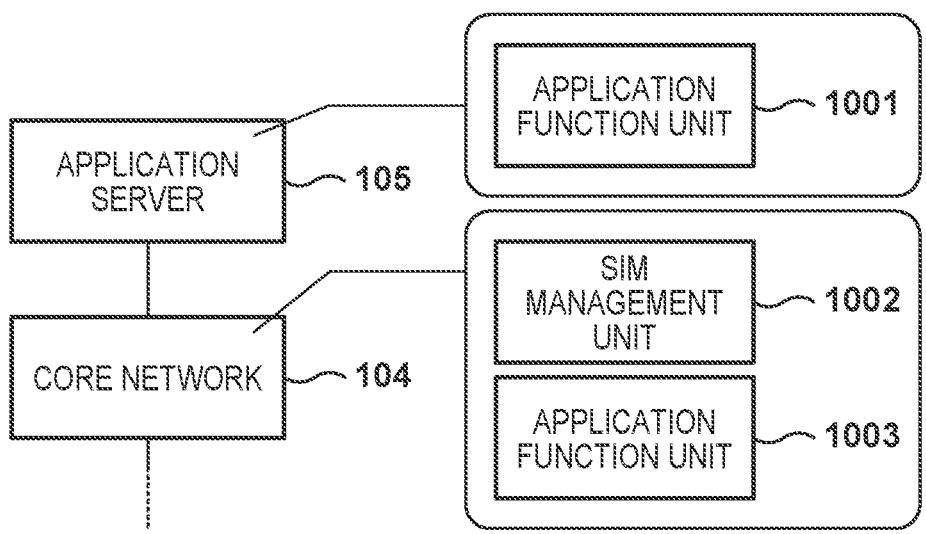
FIG. 10A is a block diagram showing another example of the configuration of the system.
Figure 10B:
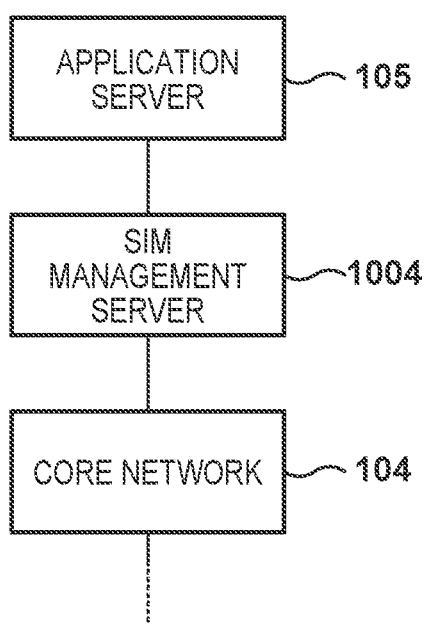
FIG. 10B is a block diagram showing still another example of the configuration of the system.
Figure 10C:
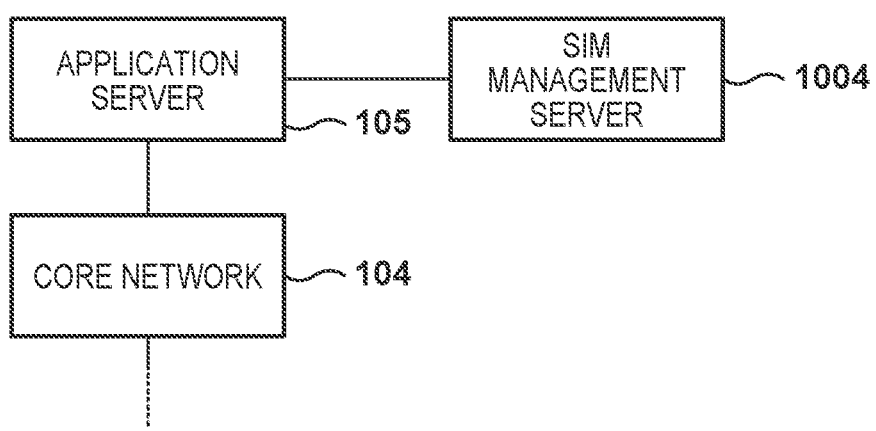
FIG. 10C is a block diagram showing still another example of the configuration of the system.

Note that the above embodiment has explained an example in a case in which the application server 105 includes the application function unit 106 and the SIM management unit 107. However, for example, the SIM management unit 107 may exist outside the application server 105. For example, as shown in FIG. 10A, the application server 105 may include an application function unit 1001, and a SIM management unit 1002 may be provided in the core network 104. Furthermore, an application function unit 1003 concerning at least some application services may be provided in the core network 104. As shown in FIGS. 10B and 10C, a SIM management server 1004 having a SIM management function may be provided separately from the application server 105. Note that the SIM management server 1004 may be arranged between the core network 104 and the application server 105, as shown in FIG. 10B, or the application server 105 may be arranged between the core network 104 and the SIM management server 1004, as shown in FIG. 10C. Note that the SIM management server 1004 or the application server 105 including the SIM management unit in each of the above-described embodiments is an information processing apparatus configured to decide a recommended SIM based on subscriber contract information and the like, and need not have the form of the server.

Note that the above embodiment has explained the communication apparatus 101 that performs wireless communication in the cellular communication system but the present invention is not limited to this. That is, the communication apparatus 101 may use a communication line such as a public wireless LAN service, or use a wired communication line. For example, the communication apparatus 101 that has contracted for a plurality of wired communication lines may execute the above-described processing to decide which of the wired communication lines is to be used.

As described above, the system that can execute the above-described functions can be formed in various forms, and the detailed arrangement is not limited to the above-described one. Similarly, the present invention is not limited to the above-described processing procedures and apparatus arrangements and various modifications and changes can be made to the above-described processing procedures and apparatus arrangements, as a matter of course.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:
1. A communication apparatus comprising:
at least one memory that stores a set of instructions; and at least one processor that executes the instructions, the instructions, when executed, causing the communication apparatus to perform operations including:
  notifying, in a case where an application using communication is activated, a predetermined information processing apparatus of information concerning the application;
  obtaining, based on information concerning contracts of a user of the communication apparatus with respect to a plurality of communication lines respectively provided by a plurality of communication carriers, from the predetermined information processing apparatus, information concerning a communication line recommended to be used to execute the application among the plurality of communication lines; and
  executing, based at least on the obtained information concerning the communication line, control concerning setting of a use communication line.

2. The communication apparatus according to claim 1, wherein the operations further include notifying the predetermined information processing apparatus of the information concerning the contracts.

3. The communication apparatus according to claim 2, wherein in a case where a request for the information concerning the contracts is received from the predetermined information processing apparatus, the information concerning the contracts is notified to the predetermined information processing apparatus.

4. The communication apparatus according to claim 1, wherein in a case where a communication line used to make notification of the information concerning the application is a recommended communication line, information indicating that it is unnecessary to switch the communication line is obtained.

5. The communication apparatus according to claim 1, wherein in a case where a communication line used to make notification of the information concerning the application is not a recommended communication line, information for specifying the recommended communication line is obtained.

6. The communication apparatus according to claim 1, wherein in a case where a communication line used to make notification of the information concerning the application is not a recommended communication line, control to switch the use communication line is executed.

7. The communication apparatus according to claim 1, wherein the operations further include making an inquiry to a user about whether to use a communication line recommended to be used to execute the application that is specified based on the obtained information.

8. The communication apparatus according to claim 7, wherein in a case where a communication line used to make notification of the information concerning the application is a recommended communication line, the inquiry is not made.

9. The communication apparatus according to claim 8, wherein in a case where a first setting is made as an operation setting of the communication apparatus concerning a communication line, even in a case where a communication line used to make notification of the information concerning the application is not a recommended communication line, the inquiry is not made.

10. The communication apparatus according to claim 1, wherein the information concerning the contracts includes information of service contents in each of the plurality of communication lines.

11. The communication apparatus according to claim 1, wherein the information concerning the contracts includes at least one of an Integrated Circuit Card ID (ICCID), an embedded Universal ICCID (eUICCID), an International Mobile Subscriber ID (IMSI), and an Mobile Station International Subscriber Directory Number (MSISDN) corresponding to each of the plurality of communication lines.

12. A control method executed by a communication apparatus, comprising:
  notifying, in a case where an application using communication is activated, a predetermined information processing apparatus of information concerning the application;
  obtaining, based on information concerning contracts of a user of the communication apparatus with respect to a plurality of communication lines respectively provided by a plurality of communication carriers, from the predetermined information processing apparatus, information concerning a communication line recommended to be used to execute the application among the plurality of communication lines; and
  executing, based at least on the obtained information concerning the communication line, control concerning setting of a use communication line.

13. A non-transitory computer-readable storage medium that stores a program for causing a computer included in a communication apparatus to perform operations including:
  notifying, in a case where an application using communication is activated, a predetermined information processing apparatus of information concerning the application;
  obtaining, based on information concerning contracts of a user of the communication apparatus with respect to a plurality of communication lines respectively provided by a plurality of communication carriers, from the predetermined information processing apparatus, information concerning a communication line recommended to be used to execute the application among the plurality of communication lines; and
  executing, based at least on the obtained information concerning the communication line, control concerning setting of a use communication line.

* * * * *